United States Patent [19]

Schroeder

[11] Patent Number: 4,667,510

[45] Date of Patent: May 26, 1987

[54] METHOD AND APPARATUS FOR LOCATING TOP DEAD CENTER POSITION OF A PISTON OF AN INTERNAL COMBUSTION ENGINE

[75] Inventor: Thaddeus Schroeder, Sterling Heights, Mich.

[73] Assignee: General Motors Corporation, Detroit, Mich.

[21] Appl. No.: 849,845

[22] Filed: Apr. 9, 1986

[51] Int. Cl.$^4$ ............................................ G01M 15/00
[52] U.S. Cl. .................................................. 73/117.3
[58] Field of Search .................. 73/117.3, 119 A, 116; 364/551

[56] References Cited

U.S. PATENT DOCUMENTS

| | | | |
|---|---|---|---|
| 2,841,979 | 7/1958 | Harbert | 73/35 |
| 3,678,741 | 7/1972 | Burley | 73/116 |
| 3,978,720 | 9/1976 | Ford | 73/116 |
| 4,147,054 | 4/1979 | Hohenberg et al. | 73/117.3 |
| 4,384,480 | 5/1983 | Krage et al. | 73/116 |
| 4,492,114 | 1/1985 | Yamanaka et al. | 73/117.3 |

Primary Examiner—Jerry W. Myracle
Attorney, Agent, or Firm—C. R. Meland

[57] ABSTRACT

A method and apparatus for determining the location of the top dead center position of a piston of an internal combustion engine. A light sensor is provided to sense the infrared radiation generated by the heating of air in the combustion chamber of the engine during the compression stroke. The light sensor is connected to an electronic circuit that develops a curve that represents light intensity. This curve has a peak and the crankshaft angle at which the peak occurs is detected and utilized in conjunction with an engine speed related correction factor to determine the crankshaft angle corresponding to the top dead center position of the piston.

5 Claims, 6 Drawing Figures

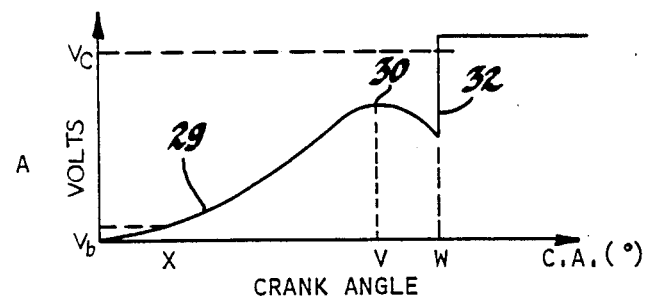
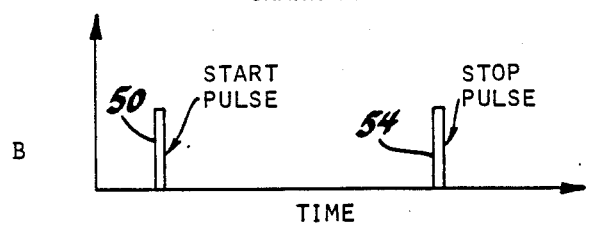
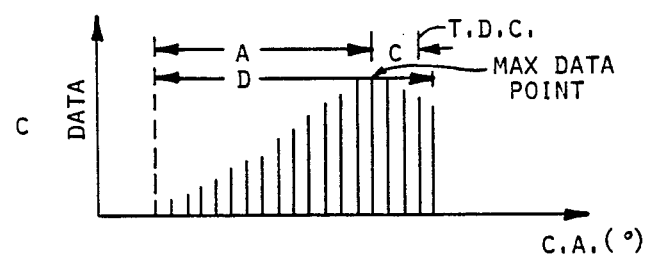
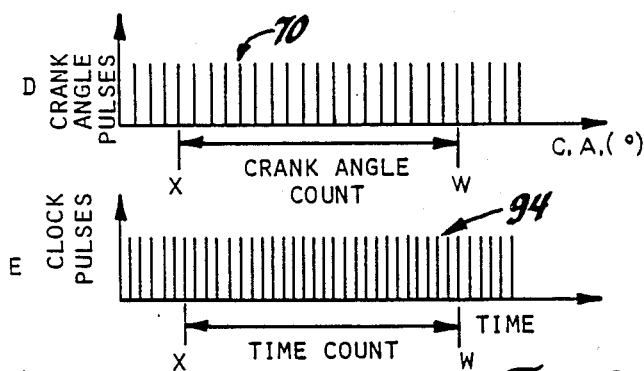
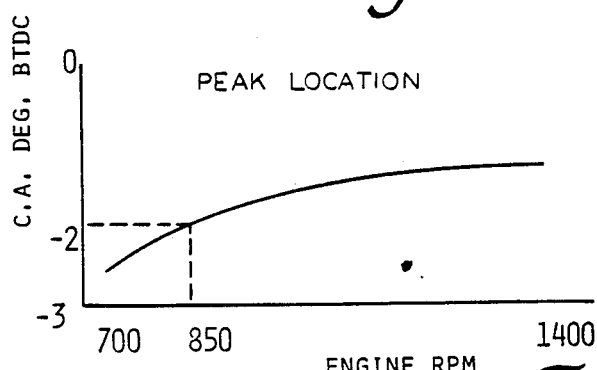
Fig. 2
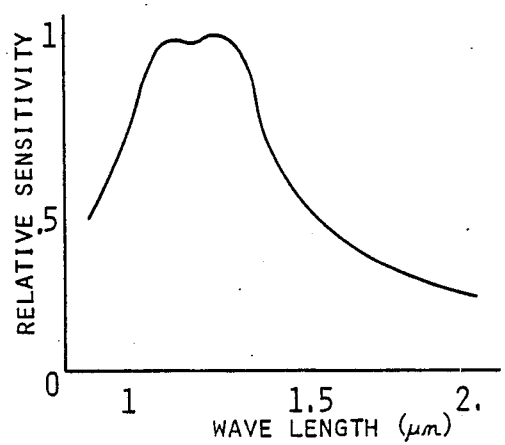
Fig. 3
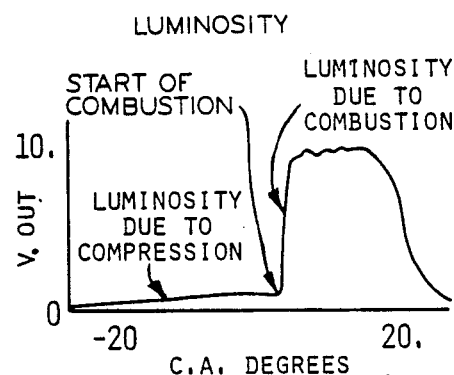
Fig. 4
Fig. 5

METHOD AND APPARATUS FOR LOCATING TOP DEAD CENTER POSITION OF A PISTON OF AN INTERNAL COMBUSTION ENGINE

This invention relates to a method and apparatus for determining the location of the top dead center position of the piston of an internal combustion engine and for providing timing angle information which relates the position of the piston when combustion occurs, to the top dead center position of the piston.

One known dynamic method of locating the top dead center position of a piston is to couple microwave energy into the combustion chamber of the engine and detect the reflected waveform. This method is disclosed in the Krage et al. U.S. Pat. No. 4,384,480. When using this microwave method of top dead center detection, the time that combustion occurs can be detected by a luminosity detector. The crankshaft angle at which combustion occurs is determined and it is related to the crankshaft position that occurs when the piston is in its top dead center position to determine the timing angle. The microwave energy can be supplied to the combustion chamber of a diesel engine by a probe which can be inserted in a hole that normally receives the engine glow plug. This probe also includes means for providing the luminosity detection function so that the probe operates as a microwave transmission device and as a luminosity detector.

This invention differs from the microwave-luminosity method that has been described in that it is capable of locating the top dead center position of an engine piston and the time of combustion by using only luminosity information and hence the apparatus associated with the microwave method are eliminated.

It accordingly is an object of this invention to provide a method and apparatus for determining the top dead center position of the piston of an internal combustion engine and for determining the crankshaft angle between this position and the position of the crankshaft when combustion occurs that utilizes only luminosity information. In a preferred method and apparatus for attaining this object, a light sensor senses the infrared radiation generated by the heating of the air in the combustion chamber during the compression stroke. The light sensor is connected to an electric circuit that develops a voltage that defines a luminosity signal or waveform wherein the amplitude of the signal varies as the piston moves toward top dead center during the compression stroke. This waveform has a peak that occurs prior to the time that the piston reaches its top dead center position. The distance between the position of the piston, where the waveform peak occurs and the position of the piston when it is at top dead center, has a predetermined relationship that is a function of engine speed. The method and system of this invention utilizes a crankshaft position sensor or encoder that develops a series of crankshaft position pulses as the crankshaft rotates. The space or time between consecutive occurring position pulses are a function of a predetermined angle of rotation of the crankshaft so that a pulse is developed each time the crankshaft rotates through a predetermined constant angle.

The amplitude of the luminosity waveform or signal is determined each time a crankshaft position pulse occurs and this amplitude is then placed in the memory of a digital computer, with each amplitude being identified by a particular crankshaft position in the memory of the computer. The luminosity amplitude-crankshaft position data in memory is now processed to determine at which crankshaft angle or position the peak in the luminosity waveform occurred. When this crankshaft angle is determined the position or crankshaft angle at which the piston reached top dead center can be computed by the computer from data that relates engine speed to the position of top dead center relative to the occurrence of the peak of the luminosity signal. When combustion occurs, the luminosity signal makes an abrupt transition and the crankshaft angle, where this occurs, is placed in the memory of the computer. This crankshaft angle can now be related to the top dead center crankshaft angle to determine the timing angle.

The system that has been thus far been described depends on locating the peak of the luminosity signal and can only be used where combustion occurs after the luminosity peak occurs, which corresponds to retarded or slightly advanced combustion timing. Thus, if combustion occurs, before the peak in the luminosity signal occurs, there will be no peak that can be detected because of the abrupt transition in luminosity signal due to combustion. In order to locate top dead center, under a condition of operation in which combustion occurs before the luminosity peak occurs, the method and system of this invention can be arranged such that a portion of the luminosity curve, that is developed prior to combustion, is sampled and placed in memory such that the data placed in memory relates the amplitude of the luminosity signal and crankshaft position. This data, which defines the beginning of the luminosity curve, is then processed in the digital computer by a curve matching process which compares this data with reference data stored in the computer. The location of the peak of this computer stored reference data can now be used to determine the top dead center position of the piston by relating it to the speed related function of top dead center position relative to the luminosity peak.

IN THE DRAWINGS

FIG. 2 is a set of curves 2A-2E which are useful in understanding this invention;

FIG. 3 is a curve of relative sensitivity versus light wave length of a photoresistor that is used to sense the light generated in a combustion chamber of an engine when the top dead center position of the piston of the engine is being located by the system of FIG. 1;

FIG. 4 illustrates the voltage developed across a photoresistor that is used as a combustion chamber light sensor in the system of FIG. 1 at various crankshaft and piston positions;

FIG. 5 is a curve which relates engine speed to the amount of deviation of the top dead center position of the piston from a position of the piston wherein a luminosity signal, provided by the system of this invention, develops a peak.

Figure 1:
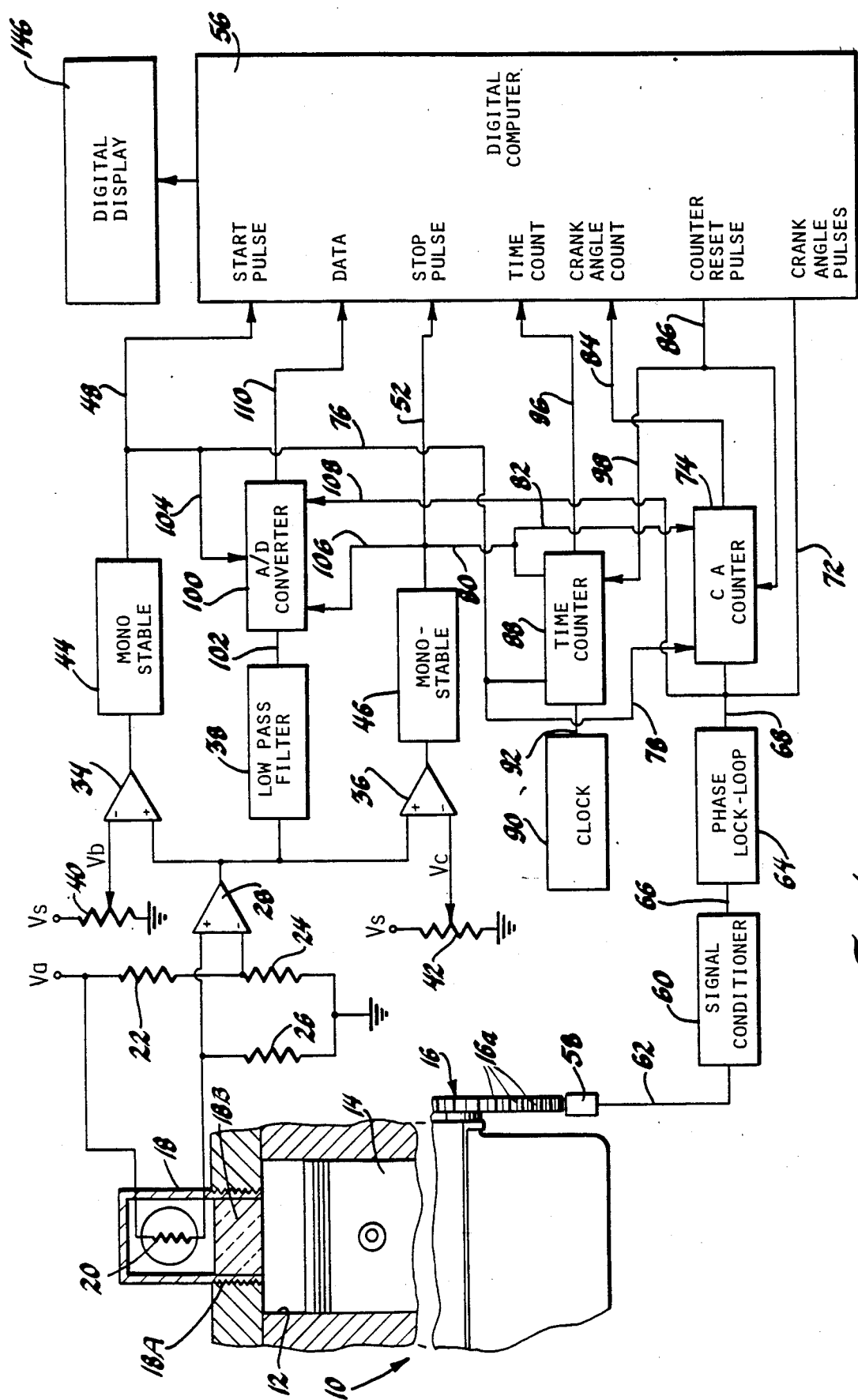
FIG. 1 illustrates a piston top dead center location system made in accordance with this invention.

Referring now to the drawings and more particularly to FIG. 1 the reference numeral 10 designates a four cycle diesel engine which has a plurality of cylinders, one of which is designated as 12. A piston 14 reciprocates in cylinder 12 and is connected to the crankshaft of the engine. The crankshaft drives a ring gear 16 having a plurality of uniformly spaced ring gear teeth 16A.

A probe 18 has a threaded portion 18A that is threaded into an opening that communicates with the interior of cylinder 12. This threaded opening may be the opening that normally receives the glow plug for the engine. The probe 18 carries a glass or quartz window 18B that transmits light generated in the engine combustion chamber to a photoresistor 20 that is located in probe 18. The photoresistor should have the capability of sensing infrared radiation that is generated by the heating of the air in the cylinder during the compression stroke of piston 14. An example of a photoresistor that can accomplish this is a lead sulfide type of photoresistor manufactured by Honeywell Inc. and designated as a type 104662E photoresistor. A curve of relative sensitivity versus light wave length, for this photoresistor, is illustrated in FIG. 3. It is seen, from FIG. 3, that this photoresistor has a spectral characteristic that has a substantial "tail" that reaches far into the infrared region. Although the maximum spectral sensitivity of this photoresistor lies in the near infrared range between 1.1 and 1.3 $\mu$m, it still retains more than 20% of its peak sensitivity at 2 $\mu$m. This feature, as previously mentioned, allows the detection of infrared radiation generated by the heating of the air in the cylinder 12 during the compression stroke of piston 14 and prior to the time that fuel is injected into the cylinder to cause air-fuel combustion.

FIG. 4 illustrates the output voltage of the photoresistor 20 versus engine crankshaft angle. The curve of FIG. 4 is developed by applying a voltage to the photoresistor and then determining the voltage developed across the photoresistor. The resistance of the photoresistor varies with light intensity and accordingly the voltage across it varies with light intensity. Thus during compression of air the resistance of the photoresistor is much less than it is when combustion occurs, as is evident from an inspection of FIG. 4.

The output voltage of photoresistor 20 is connected to a circuit that emphasizes the portion of the signal, due to the compression of air, to develop the signal illustrated in FIG. 2A. Thus, the photoresistor 20 is connected to three resistors 22, 24 and 26 which form a bridge circuit connected to a voltage source $V_a$. Resistor 22 has a resistance value that is substantially equal to the dark resistance value of photoresistor 20. The resistance values of resistors 24 and 26 are equal and may be, for example, equal to one-half the resistance value of resistor 22. The output voltage of the bridge circuit is applied to a differential amplifier 28 and the output voltage of this amplifier is depicted in FIG. 2A and identified by reference numeral 29. In FIG. 2A the output voltage 29, of differential amplifier 28, is plotted as a function of engine crankshaft angle. It can be seen that signal 29 has a peak, designated by reference numeral 30, that occurs at a crankshaft angle designated as V. At the crankshaft angle designated as W, combustion occurs so that the output voltage 29 makes an abrupt transition, designated as 32, where the magnitude of the output voltage exceeds $V_c$.

The top dead center position of piston 14 is related to the crank angle V where the peak 30 occurred. Thus, the top dead center position of piston 14 will be a few crank angle degrees past crank angle V and its position is a function of engine speed. This is depicted in FIG. 5 where the magnitude of crank angle (crank angle degrees before top dead center) that the top dead center position is shifted from the peak location V is plotted against engine speed. It can be seen, in FIG. 5, that at an engine speed of 850 rpm the top dead center position of the piston will be about 2 crankshaft degrees after the occurrence of the peak 30 or 2 crankshaft degrees after crankshaft angle V. The curve of FIG. 2A corresponds to a condition of operation in which the occurrence of combustion is retarded, that is combustion has occurred after the piston reached its top dead center position. The time that combustion occurs is, of course, related to the time that fuel is injected and the curve of FIG. 2A may be termed as depicting retarded timing.

The output of differential amplifier 28 is connected as one input to voltage comparators 34 and 36 and to the input of a low pass filter 38. The low pass filter 38 serves to eliminate higher frequency components that could be potentially disturbing. The negative input terminal of voltage comparator 34 receives a reference voltage $V_b$ supplied by variable resistor 40 that has a voltage $V_s$ applied thereto. In a similar fashion, the negative input terminal of voltage comparator 36 receives a reference voltage $V_c$ from variable resistor 42 that has the voltage $V_s$ applied thereto. The output of comparator 34 is connected to a monostable multivibrator 44 and the output of comparator 36 is connected to monostable multivibrator 46.

When the output voltage 29 of amplifier 28 exceeds the reference voltage $V_b$ the comparator 34 develops an output to trigger the monostable multivibrator 44 which in turn develops a start pulse that is applied to line 48. This start pulse is illustrated in FIG. 2B where it is identified by reference numeral 50. The start pulse is developed at the beginning of the compression stroke of piston 14 and occurs when the signal 29 of FIG. 2A exceeds the reference voltage $V_b$.

When the output voltage 29 of amplifier 28 (FIG. 2A) exceeds the reference voltage $V_c$, during the abrupt transition 32, the comparator 36 develops an output to trigger the monostable multivibrator 46 which then develops a stop pulse on line 52. This stop pulse is designated as 54 and it occurs at the onset of combustion. Thus, when combustion occurs within cylinder 12 the resistance of photoresistor 20 increases abruptly to cause the abrupt voltage change 32 illustrated in FIG. 2A. The stop pulse 54 occurs at the crank angle W, illustrated in FIG. 2A.

The lines 48 and 52 are connected to a digital computer 56 and accordingly the start and stop pulses 50 and 54 are applied to computer 56.

The system of FIG. 1 has a variable reluctance or magnetic pickup 58 that includes a pickup coil. The pickup 58 is located adjacent the outer periphery of ring gear 16 and the variable reluctance of the alternate teeth 16A and notches of the ring gear cause a voltage to be induced in the pickup coil of the pickup 58 as the ring gear 16 rotates, in a manner well known to those skilled in the art. The output voltage of pickup 58 is applied to a signal conditioner 60 by line 62. The output of the signal conditioner is a series of consecutive occurring pulses that are applied to a phase locked loop 64 by line 66. A pulse on line 66 occurs each time the crankshaft of engine 10 rotates through a predetermined constant angle since the flywheel or ring gear teeth 16A are uniformly spaced. The output of the phase locked loop is applied to line 68 and is a series of pulses identified as crank angle pulses in FIG. 2D and also identified by reference numeral 70 in FIG. 2D. The phase locked loop 64 operates as a frequency multiplier. The frequency of the pulses 70 can be such that a pulse occurs each time the crankshaft of the engine rotates through an angle of about 0.10 degrees. Thus, the spacing between consecutive pulses 70 corresponds to a crankshaft rotation of 0.10 degrees.

The crank angle pulses 70 on line 68 are applied to digital computer 56 by line 72 and are applied to a crank angle counter 74. Then a start pulse 50 is developed on line 48 it is coupled to the crank angle counter 74 by lines 76 and 78 to cause the crank angle counter 74 to count up. Thus, at the beginning of the compression stroke of the piston of the engine the crank angle counter will start counting up at a point identified as X in FIG. 2D. When a stop pulse 54 is developed on line 52 it is coupled to crank angle counter 74 via lines 80 and 82 and causes the crank angle counter 74 to terminate counting. In view of the foregoing, it will be evident that the count that is attained by crank angle counter 74, between the occurrence of the start and stop pulses 50 and 54, represents a certain angular rotation of the crankshaft of the engine in crankshaft angle degrees. The count that is attained in crank angle counter 74 is loaded into the digital computer 56 via line 84. The crank angle counter 74 is connected to a line 86 that is connected to computer 56. The computer 56, at times, outputs a reset pulse to line 86 which causes the counter 74 to be reset to zero.

The system of FIG. 1 has a time counter 88 connected to clock oscillator 90 by line 92. The output of clock 90, on line 92, is a series of pulses identified as clock pulses and also by reference numeral 94 in FIG. 2E. These pulses are of a constant frequency. When a start pulse 50 is developed on line 48 this pulse is applied to time counter 88 by line 76 to cause the time counter to count-up. The counter 88 counts the clock pulses 94 and continues to count-up until a stop pulse 54 is developed on line 52. This stop pulse is applied to counter 88 by line 80 and when it occurs, the counting-up of counter 88 is terminated. The count that is attained by time counter 88 represents the time that elapsed between the occurrence of the start pulse 50 and the stop pulse 54. The count in counter 88 is transferred to computer 56 by line 96. The time counter 88 is periodically reset to zero by a reset pulse applied to it via lines 86 and 98.

The attained count in time counter 88 represents time and the attained count in crank angle counter 74 represents the angular distance that the crankshaft has moved. Since speed is equal to distance divided by time the digital computer 56 computes engine rpm by dividing the count attained in the crankshaft angle counter 74 by the count attained in the time counter 88. This is described in more detail hereinafter.

The system of FIG. 1 includes an analog-to-digital converter 100 that includes sample and hold circuitry. The output of the low pass filter 38, which corresponds to the signal illustrated in FIG. 2A, is applied to the input of the converter 100 by line 102. The converter is enabled when start pulse 50 is developed on line 48. This pulse is coupled to converter 100 by line 104. The converter 100 is disabled when the stop pulse 54 is developed on line 52. The stop pulse is coupled to converter 100 by line 106. During the time that the converter is enabled or operative, that is the time period between the start and stop pulses, it samples the magnitude of the signal 29 illustrated in FIG. 2A each time a crank angle pulse 70 occurs. Thus, the crank angle pulses 70 on line 68 are coupled to converter 100 by line 108. Each time a crank angle pulse 70 is developed it causes the sample and hold portion of converter 100 to sample the amplitude of the signal 29 shown in FIG. 2A and converts this analog value to a digital signal that is applied to computer 56 by data line 110. The crank angle pulses 70 are also applied to computer 56 by line 72. Each time a crank angle pulse 70 is applied to computer 56 via line 72 the computer assigns the digital signal on line 110 to a particular memory location which corresponds to a particular crank angle pulse 70. FIG. 2C depicts what has been just described. Thus, the vertical lines in FIG. 2C, which have been identified as data, represent the digital magnitude of the signal illustrated in FIG. 2A at each occurrence of a crank angle pulse 70. The maximum digital value occurs at a crank angle value V which corresponds to the occurrence of peak 30 in FIG. 2A. The minimum digital value in FIG. 2C coincides with the development of the start pulse 50.

The computer 56 acquires data during the period between start pulse 50 and stop pulse 54. This data identifies the amplitude of the signal illustrated in FIG. 2A for each crank angle pulse, as is depicted in FIG. 2C. This data acquisition period begins at some point or crank angle at the beginning of the compression stroke of piston 14 and ends when combustion occurs at point W.

Figure 6:
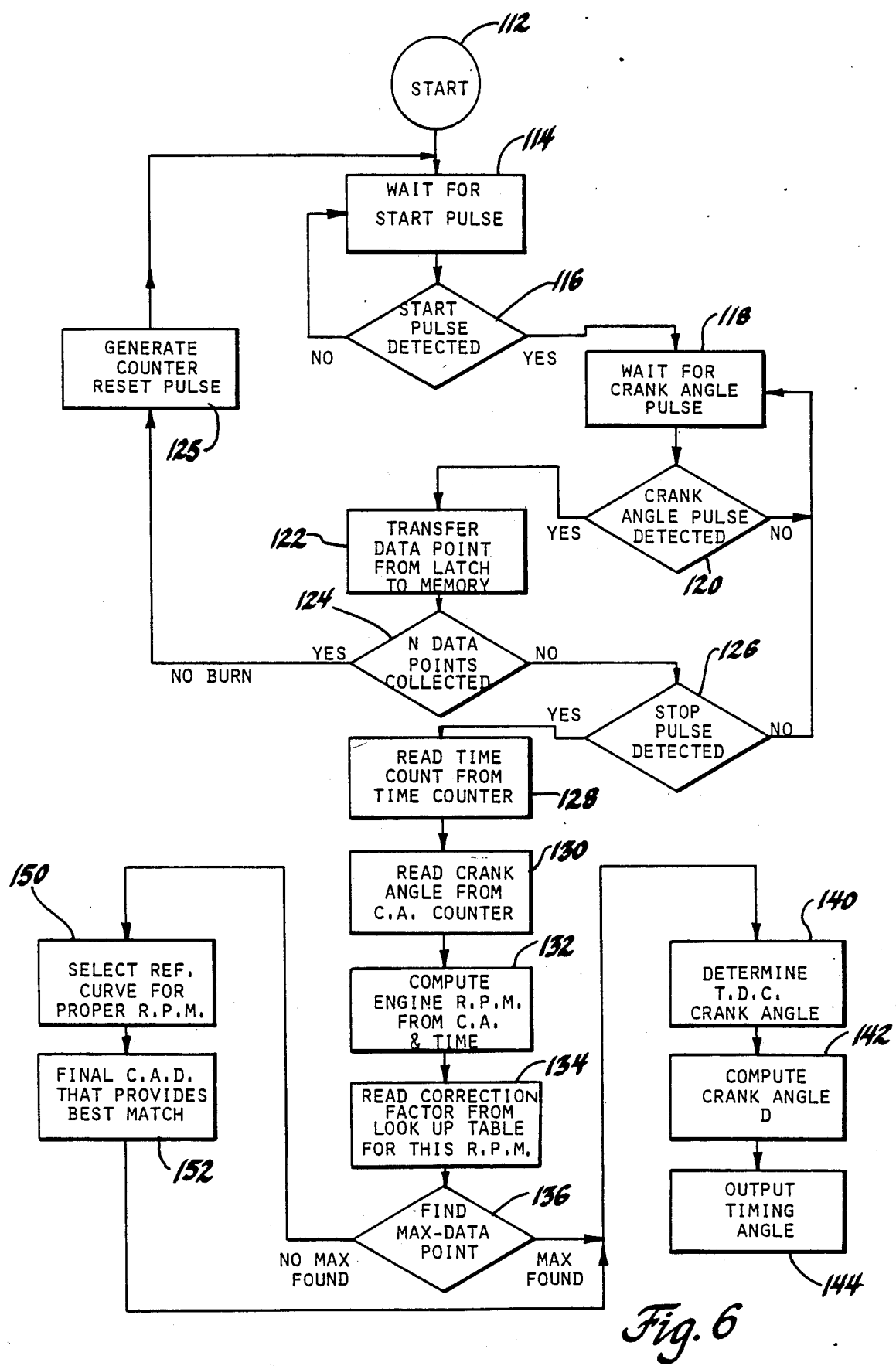
FIG. 6 is a computer program illustrating the steps that are executed by the digital computer shown in FIG. 1.

The computer 56 is programmed to execute the program illustrated in FIG. 6, which will now be described. The program begins with the start step identified as 112. In step 114 the computer waits for the start pulse 50. When the start pulse 50 is detected at decision point 116 the program proceeds to step 118 where the computer waits for the occurrence of a crank angle pulse 70. When a crank angle pulse is detected at decision point 120 the program proceeds to step 122. In step 122 the data illustrated in FIG. 2C is transferred to the computer 56. This data, as previously mentioned, relates the magnitude of signal 29 to each crank angle position of the crank angle pulses 70 that are sampled. At decision point 124 a determination is made as to whether or not a certain number N of data points has been collected. The number of data points collected will normally correspond to the number of crank angle pulses 70 that occur between the start pulse 50 and the stop pulse 54. The number of pulses N is selected to be a number that is larger than the number of pulses that can be expected to occur between the start pulse 50 and the stop pulse 54. The stop pulse 54 occurs when cylinder combustion begins and, if for some reason, the engine does not fire indicated as a no burn condition in FIG. 6, the number of data points collected will exceed the number N and the program will then go through another cycle of data acquisition. Thus, if the answer is yes at decision point 124, the program generates a counter reset pulse as indicated as step 125 which resets both counters 74 and 88 to zero and causes the program to go through another data acquisition cycle. If N data points are not collected the program proceeds to decision point 126 where it is determined whether or not the stop pulse 54 has been detected.

If the stop pulse 54 is detected, the program proceeds to step 128 where the attained time count in time counter 88 is read. The program now proceeds to step 130 where the attained count in crank angle counter 74 is read. In step 132 engine speed (rpm) is computed by dividing the attained count in crank angle counter 74 (degrees) by the attained count in time counter 88

(time). This computation is made such that speed is computed in terms of rpm.

When the speed of the engine has been determined, as described, the program proceeds to step 134. During step 134 a correction factor for the top dead center position of the piston is read. This is accomplished by placing the data illustrated in FIG. 5 in a look-up table form in a ROM (read only memory) that is part of the digital computer 56. This ROM has not been illustrated but it is addressed during step 134 in a known manner to read a top dead center correction factor in terms of degrees that is related to the engine speed that was determined by step 132. Thus, by way of example, if engine speed was 850 rpm during the time that data was acquired the ROM is addressed at the 850 rpm memory location and a crank angle correction factor of 2 degrees is read out of the ROM and stored in a register to be used in a manner to be described. The data contained in the ROM (correction factor magnitude) is empirically determined for each family of engines and is determined by not firing the engine. In other words, no fuel is injected so that the curve that is developed is the result of compressing air. Since engine temperature has some effect on the curve of FIG. 5 various FIG. 5 curves can be provided for different temperatures. The system can then select a given curve based on engine temperature.

When step 134 is completed, the program proceeds to step 136. During step 136 the digital computer determines which data point illustrated in FIG. 2C has the maximum magnitude. Thus, as previously pointed out, each data point or crank angle position illustrated in FIG. 2C has a magnitude associated with it that is a function of the shape of curve 29. Each data point or crank angle position corresponds to a memory location in the memory of the digital computer. The memory locations are addressed and read and compared to determine which memory location contains the maximum magnitude or in other words, the crank angle location of the peak 30 of signal 29. One method of accomplishing this is to compare successive magnitudes. As long as the magnitudes successively increase the peak 30 has not yet been reached. When a maximum magnitude is followed by a decreasing magnitude the peak 30 is identified. In FIG. 2C the crank angle position that has the maximum magnitude is crank angle V. Since crank angle V has now been identified, the computer can compute the crank angle between start pulse 50 (crank angle X) and crank angle V. Since the crankshaft pulses are uniform and occur at fixed crank angles the crankshaft angle in degrees between points X and V is computed by multiplying the number of crankshaft pulses 70 that occurred between crank angle positions X and V by a factor, for example of 0.10 degrees per pulse.

Since the computer has now determined the crankshaft angle in degrees, between data points or crankshaft angles X and V, the top dead center position of the piston can now be determined. Assuming that the crankshaft angle between points X and V in degrees is denoted as A and the correction factor of FIG. 5 in degrees is denoted as C the crank angle of the top dead center position of the piston from crank angle or point X will be equal to A+C where C in crank angle degrees is a positive value. Step 140 of the program determines the crank angle of the top dead center position of the piston by performing the calculation that has just been described.

Ignition timing of an engine is ordinarily defined as the crankshaft angle between the top dead center position of the piston and the point at which combustion occurs. Ignition timing can be determined with the system that has been described by determining the crankshaft angle between crankshaft angles or points X and W and then subtracting the crankshaft angle A+C from the angle so determined. Thus, if the crankshaft angle between data points or crank angles X and W is denoted as D, the ignition timing angle will be equal to D−(A+C) since combustion occurs at crank angle W.

During step 142 of the program, the crank angle D is computed. This is accomplished by counting the number of crankshaft pulses 70 that occurred between crank angle or data points X and W and then multiplying this count by a factor such as the previously described value of 0.10 degrees per pulse. When the crank angle D has been computed the timing angle is computed by solving the equation D−(A+C) which is equal to the timing angle.

The last step 144 in the program is to output the timing angle. The timing angle can be outputted to a digital display 146, illustrated in FIG. 1. Moreover, at the conclusion of step 140 the top dead center crank angle position could be displayed, if so desired.

The system and program that has been described, that locates the top dead center position of the piston by identifying the crank angle position of the peak 30 of signal 29, can be used as described as long as ignition timing is retarded or only slightly advanced. Where ignition timing is advanced to such an extent that combustion occurs before the occurrence of the peak 30 of signal 29 the peak 30 cannot be detected because the signal 29 makes an abrupt transition 32 whenever combustion occurs. Thus, for conditions of advanced timing, the abrupt transition 32 would occur before the peak 30 and accordingly peak 30 would not be detected by the circuitry that has been described. The computer program shown in FIG. 6 operates to estimate or predict where the peak 30 should have occurred in the event that ignition timing is so far advanced that combustion occurs prior to the occurrence of peak 30. This is accomplished by step 136 of the program which determines the maximum data point corresponding to peak 30. The step 136 also determines whether or not the maximum data point corresponding to peak 30 has been found. Assuming a maximum data point was found, the program proceeds through steps 140, 142 and 144 in a manner that has been described.

If combustion occurs before peak 30 occurs the processing of the data of FIG. 2C will not locate the peak 30 because there will be no transition in amplitude data (FIG. 2C) corresponding to either side of a peak 30. In this case the sampled amplitudes will consecutively increase and there will be no decrease in an amplitude to signify the occurrence of peak 30. Under this condition of operation the computer program proceeds to step 150 instead of step 140.

Before proceeding to a description of step 150 it is pointed out that the memory of computer 56 contains reference curve data that relates crank angle degrees to luminosity signal amplitude. Thus, the reference curve data is of the type illustrated in FIG. 2C; that is, an amplitude is related to a given crank angle position. However, the reference data that is stored in memory is taken, for example, from points X to W in FIG. 2A by driving the engine, for example, by an electric motor. No fuel is injected so that no combustion occurs. The span of reference data that is collected must include and go beyond the peak 30. The reference data that is so collected will then relate the amplitude of curve 29 to consecutively occurring crank angle positions or degrees over a span, for example from X to W. Since the crank angle positions are evenly spaced the crank angle span from the peak 30 to a given preceding crank angle count or position can be readily determined. The reference curve data that is collected can provide two curves which respectively relate to two different engine speeds. This is accomplished by driving the engine at one speed and collecting data for that speed and driving the engine at another speed and collecting data for that speed.

In step 150 reference data that relates to a particular engine speed at which the engine is now running is selected. The engine is now running at substantially constant speed with fuel being injected to cause combustion. Assuming that timing is so advanced that peak 130 cannot be detected, crank angle luminosity amplitude data (actual data) will nevertheless be collected up to the point where combustion occurs. In step 152 (FIG. 6) the reference data is compared with the actual data to find the best match between amplitude values of the actual data and amplitude values of the reference data. Thus, a given amplitude that relates to a given crank angle of the actual data is compared with the amplitudes of the reference data. When a match or substantial match is made a particular crank angle of the reference data at which the match occurred is identified. This particular crank angle position is at a certain number of crank angle degrees and since the data pulses are evenly spaced it is at a certain number of crank angle degrees before the peak 30 of the reference curve data. The crank angle position of the peak 30 of the stored reference curve data has now been identified.

Having identified the crank angle count or position of the peak 30 the program proceeds through steps 140, 142 and 144. The correction factor, determined in step 134, is used with the crank angle determination of step 152 to determine the top dead center crank angle or count in step 140.

It will, of course, be appreciated that the system of this invention can be substantially simplified if the engine to be tested is always run at only one speed. Thus, if only one engine speed is to be used during testing of the engine the stored data that represents the curve of FIG. 5 could be only one value that relates to a given speed. For example, if the engine were always to be tested at 850 rpm this one value would be 2 degrees. This one value could be varied as a function of temperature, as previously described. By running the engine at only one speed other parts of the system that require a detection of engine speed could likewise be eliminated or simplified.

The embodiments of the invention in which an exclusive property or privilege is claimed are defined as follows:

1. The method of locating the top dead center position of a piston of a diesel internal combustion engine that is reciprocable within a cylinder of the engine and which is connected to the crankshaft of the engine, the steps comprising, while the engine is running detecting light radiation developed within said cylinder when said piston is operating in its compression stroke, developing an electrical signal the magnitude of which varies in accordance with the intensity of the light radiation, said signal having a peak that occurs at a position of said piston that is prior to the top dead center position of said piston, recording data that includes simultaneous crankshaft positions and signal magnitudes for a succession of crankshaft positions during the compression stroke of the engine, determining from said data the peak related crankshaft position at which said peak occurred, determining engine speed, developing a correction crank angle value from data that relates engine speed to a crank angle value that is indicative of the amount of crank angle deviation of the top dead center position of the piston and the position of the piston when said peak occurred, and then combining data indicative of the crankshaft position of said piston when said peak occurred and said crank angle correction value to thereby determine the location of piston top dead center.

2. The method of locating the top dead center position of a piston of a diesel internal combustion engine that is reciprocable within a cylinder of the engine and which is connected to the crankshaft of the engine, the steps comprising, running the engine at a predetermined substantially constant speed, while the engine is running detecting light radiation developed within said cylinder when said piston is operating in its compression stroke, developing an electrical signal the magnitude of which varies in accordance with the intensity of the light radiation, said signal having a peak that occurs at a position of said piston that is prior to the top dead center position of said piston, recording data that includes simultaneous crankshaft positions and signal magnitudes for a succession of crankshaft positions during the compression stroke of the engine, determining from said data the peak related crankshaft position at which said peak occurred, developing a correction crank angle value from data that relates said predetermined constant engine speed to a crank angle value that is indicative of the amount of crank angle deviation of the top dead center position of the piston and the position of the piston when said peak occurred, and then combining data indicative of the crankshaft position of said piston when said peak occurred and said crank angle correction value to thereby determine the location of piston top dead center.

3. The method of locating the top dead center position of a piston of a diesel internal combustion engine that is reciprocable within a cylinder of the engine and which is connected to the crankshaft of the engine, the steps comprising, detecting light radiation developed within said cylinder when said piston is operating in its compression stroke, developing an electrical signal the amplitude of which varies in accordance with the intensity of the light radiation, said signal having a peak that occurs at a position of said piston that is prior to the top dead center position of said piston, recording data that includes simultaneous crankshaft positions and signal magnitudes for a succession of crankshaft positions during the compression stroke of the engine, storing the recorded data, determining from said stored data the peak related crankshaft position at which said peak should occur, determining engine speed, developing a correction crank angle value from data that relates engine speed to a crank angle value that is indicative of the amount of crank angle deviation of the top dead center position of the piston and the position of the piston when said peak should occur, and then combining data indicative of the crankshaft position of said piston when said peak should occur and said crank angle correction value to thereby determine the location of piston top dead center.

4. The method of locating the top dead center position of a piston of a diesel internal combustion engine that is reciprocable within a cylinder of the engine and which is connected to the crankshaft of the engine, the steps comprising, while the engine is running detecting light radiation developed within said cylinder when said piston is operating in its compression stroke, developing an electrical signal the magnitude of which varies in accordance with the intensity of the light radiation, recording actual data that includes simultaneous crankshaft positions and signal magnitudes for a succession of crankshaft positions during the compression stroke of the engine and prior to cylinder combustion, storing reference data that includes simultaneous crankshaft positions and signal magnitudes that have been developed by operating the engine without combustion, said reference data being developed by detecting light radiation within a cylinder and developing an electrical signal the magnitude of which varies with intensity of the light radiation, the signal having a peak that occurs at a certain position of said piston, and said reference data having a certain magnitude at a certain crankshaft position that identifies the peak related position of the piston, determining from a comparison of said stored and actual data the peak related crankshaft position at which said peak occurred, determining engine speed, developing a correction crank angle value from data that relates engine speed to a crank angle value that is indicative of the amount of crank angle deviation of the top dead center position of the piston and the position of the piston when said peak occurred, and then combining data indicative of the crankshaft position of said piston when said peak occurred and said crank angle correction value to thereby determine the location of piston top dead center.

5. Apparatus for locating the top dead center position of a piston of a diesel internal combustion engine that is reciprocable within a cylinder of the engine and which is connected to the crankshaft of the engine comprising, light detector means associated with a cylinder of said engine for detecting light radiation developed within said cylinder when said piston is operating in its compression stroke, means connected to said light detector means for developing an electrical signal the magnitude of which varies in accordance with the intensity of the light radiation, said signal having a peak that occurs at a position of said piston that is prior to the top dead center position of said piston, means recording data that includes simultaneous crankshaft positions and signal magnitudes for a succession of crankshaft positions during the compression stroke of the engine, said last-named means including means for developing a succession of voltage pulses in synchronism with rotation of said crankshaft, means for determining from said data the peak related crankshaft position at which said peak occurred, means coupled to the crankshaft of the engine for developing an engine speed signal that is a function of engine speed, means responsive to said engine speed signal for developing a correction crank angle value from data that relates engine speed to a crank angle value that is indicative of the amount of crank angle deviation of the top dead center position of the piston and the position of the piston when said peak occurred, and means for combining data indicative of the crankshaft position of said piston when said peak occurred and said crank angle correction value to thereby determine the location of piston top dead center.

* * * * *